United States Patent
Belenky et al.

(10) Patent No.: US 9,009,492 B2
(45) Date of Patent: Apr. 14, 2015

(54) PREVENTION OF PLAYBACK ATTACKS USING OTP MEMORY

(75) Inventors: Yaacov Belenky, Maaleh Adumim (IL); Reuben Sumner, Rechovot (IL)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/111,670

(22) PCT Filed: Jun. 19, 2012

(86) PCT No.: PCT/IB2012/053074
§ 371 (c)(1),
(2), (4) Date: Oct. 22, 2013

(87) PCT Pub. No.: WO2013/128244
PCT Pub. Date: Sep. 6, 2013

(65) Prior Publication Data
US 2014/0040625 A1 Feb. 6, 2014

(30) Foreign Application Priority Data
Feb. 29, 2012 (GB) .................................. 1203528.3

(51) Int. Cl.
*G06F 11/30* (2006.01)
*H04L 9/32* (2006.01)
(Continued)

(52) U.S. Cl.
CPC .............. *H04L 9/3247* (2013.01); *G06F 21/64* (2013.01); *G06F 3/0679* (2013.01)

(58) Field of Classification Search
CPC ... H04L 9/3247; H04L 9/3249; H04L 9/3252; H04L 9/3255; H04L 9/3257; G06F 2206/1014; G06F 2212/2142; G06F 3/0679; G06F 21/64

USPC ................. 713/150, 168, 170–172, 176–177, 713/180–181, 189, 193–194
See application file for complete search history.

(56) References Cited

U.S. PATENT DOCUMENTS 5,978,475 A * 11/1999 Schneier et al. ............... 713/177
6,101,605 A    8/2000 Buer
(Continued)

FOREIGN PATENT DOCUMENTS

EP   1 414 233 A1   4/2004
EP   1 640 844 A1   3/2006
(Continued)

OTHER PUBLICATIONS

Aug. 29, 2012 Transmittal of International Search Report and Written Opinion of the International Searching Authority for PCT/IB2012/053074.
(Continued)

*Primary Examiner* — Darren B Schwartz
(74) *Attorney, Agent, or Firm* — Husch Blackwell LLP

(57) ABSTRACT

A method for data security includes receiving, in a processor having a one-time programmable (OTP) memory, which includes multiple bits and has a current state defined by the bits of the OTP that have been programmed, new information to be written to a data memory. Based on the new information and the current state, at least one further bit of the OTP memory is selected to be programmed, thereby defining a new state of the OTP memory. A new digital signature is computed over the new information and the new state. The new information and the new digital signature are saved in the data memory. After saving the new information and the new digital signature in the data memory, the at least one further bit of the OTP memory is programmed, whereby the new state becomes the current state. Related apparatus and methods are also disclosed.

14 Claims, 3 Drawing Sheets

(51) Int. Cl.
*G06F 21/64* (2013.01)
*G06F 3/06* (2006.01)

(56) References Cited

U.S. PATENT DOCUMENTS

| | | | |
|---|---|---|---|
| 6,362,724 B1 | 3/2002 | Rosenau | |
| 6,789,159 B1 | 9/2004 | Carr et al. | |
| 6,959,090 B1 | 10/2005 | Alve et al. | |
| 7,469,338 B2 | 12/2008 | Buer | |
| 7,623,378 B1* | 11/2009 | Wahlstrom et al. | 365/185.04 |
| 7,711,944 B2 | 5/2010 | Kwon | |
| 7,761,654 B2 | 7/2010 | Buer | |
| 2002/0147918 A1 | 10/2002 | Osthoff et al. | |
| 2002/0188857 A1* | 12/2002 | Orlando et al. | 713/193 |
| 2005/0060485 A1 | 3/2005 | Buer | |
| 2005/0188207 A1* | 8/2005 | Fujimoto et al. | 713/177 |
| 2006/0107057 A1* | 5/2006 | Lewis et al. | 713/176 |
| 2007/0094507 A1* | 4/2007 | Rush | 713/176 |
| 2007/0157000 A1* | 7/2007 | Qawami et al. | 711/170 |
| 2007/0174621 A1 | 7/2007 | Ducharme | |
| 2008/0307229 A1 | 12/2008 | Andersson et al. | |
| 2009/0100272 A1* | 4/2009 | Smeets | 713/189 |
| 2011/0066787 A1* | 3/2011 | Markey et al. | 711/103 |
| 2011/0072278 A1* | 3/2011 | Izu et al. | 713/193 |
| 2011/0082966 A1* | 4/2011 | Yu et al. | 711/103 |
| 2011/0087898 A1 | 4/2011 | Williams | |
| 2011/0197069 A9 | 8/2011 | Rodgers et al. | |
| 2011/0208975 A1* | 8/2011 | Sibert | 713/189 |
| 2012/0260107 A1* | 10/2012 | Mangard | 713/190 |
| 2012/0317344 A1* | 12/2012 | Sibert | 711/103 |
| 2013/0291130 A1* | 10/2013 | Amarilio et al. | 726/30 |

FOREIGN PATENT DOCUMENTS

| | | |
|---|---|---|
| EP | 2 343 662 A1 | 7/2011 |
| EP | 2 381 672 A1 | 10/2011 |
| WO | WO 2006/108181 A2 | 10/2006 |
| WO | WO 2009/156302 A1 | 12/2009 |
| WO | WO 2010/089723 A1 | 8/2010 |

OTHER PUBLICATIONS

Jun. 13, 2012 Office Communication in connection with prosecution of GB 12 03528.3.

* cited by examiner

PREVENTION OF PLAYBACK ATTACKS USING OTP MEMORY

RELATED APPLICATION INFORMATION

The present application is a 35 USC §371 application of PCT/IB2012/053074, filed on 19 Jun. 2012 and entitled "Prevention of Playback Attacks Using OTP Memory", which was published on 6 Sep. 2013 in the English language with International Publication Number WO 2013/128244 and which relies for priority on UK Patent Application GB 1203528.3, filed 29 Feb. 2012.

FIELD OF THE INVENTION

The present invention relates generally to data security, and particularly to protecting data stored in memory against tampering.

BACKGROUND

When a user of a computerized media device purchases content on line, the content provider may download authorization information to the device in order to enable the user to access the content. The device stores this authorization information securely in data memory, which typically comprises non-volatile memory (NVM), such as flash memory. To prevent the user (or other parties) from changing the authorization information, the information may be digitally signed. An attacker who does not possess the appropriate key will then be unable to alter the authorization information. It is still possible, however, for the attacker to access the NVM and read out and store both the authorization information (which may be encrypted) and the digital signature.

If the authorization information is subsequently changed (to a lower level of authorization, for example, because the user has canceled his subscription to certain content channels or because the user has played an on-line game a certain number of times), new authorization information, with a new signature, will be written to the NVM. An attacker may replace this new authorization information and signature with the old authorization information and signature that he earlier read out and stored. He will then be able to access content for which he is no longer paying. This sort of strategy is known as a "playback attack."

SUMMARY

Embodiments of the present invention that are described hereinbelow provide techniques that can be used to enhance the security of stored data against tampering, including particularly prevention of playback attacks.

There is therefore provided, in accordance with an embodiment of the present invention, a method for data security, which includes receiving, in a processor having a one-time programmable (OTP) memory, which includes multiple bits and has a current state defined by the bits of the OTP that have been programmed, new information to be written to a data memory. Based on the new information and the current state, at least one further bit of the OTP memory is selected to be programmed, thereby defining a new state of the OTP memory. A new digital signature is computed over the new information and the new state. The new information and the new digital signature are saved in the data memory. After saving the new information and the new digital signature in the data memory, the at least one further bit of the OTP memory is programmed, whereby the new state becomes the current state.

Receiving the new information typically includes replacing old information that is stored in the data memory with the new information, wherein the old information is signed with an old digital signature in the data memory, and the method may include erasing the old information and the old digital signature from the data memory after programming the at least one bit of the OTP memory. Additionally or alternatively, the method includes, upon receiving a request to the processor to permit use of the new information, verifying the new digital signature that is saved in the data memory against the new information and the current state of the OTP memory.

In a disclosed embodiment, selecting the at least one further bit includes applying a function over the new information and the current state, the function having parameters maintained as a secret by the processor. The new digital signature depends on a distribution of the programmed bits of the OTP memory and not only on a number of the bits that have been programmed.

In some embodiments, selecting the at least one further bit includes selecting at least first and second bits, thereby defining at least first and second, respective new states, computing the new digital signature includes computing at least first and second, respective digital signatures for the at least first and second new states, and programming the at least one further bit includes attempting to program the first bit, testing the OTP memory to verify the programming of the first bit, and if the first bit has not been properly programmed, programming the second bit and saving the second digital signature while discarding the first digital signature.

Additionally or alternatively, selecting the at least one further bit includes selecting at least first and second bits based on the new information and the current state, wherein the new state of the OTP memory is defined such that in the new state, at least both the first and second bits are programmed, and programming the at least one further bit includes programming at least both the first and second bits. Selecting at least the first and second bits may include selecting the first bit based on the new information and the current state, thereby defining a first new state of the OTP memory, and selecting the second bit based on the new information and the first new state, thereby defining a second new state of the OTP memory, over which the new digital signature is computed, and the method may include, upon receiving a request to the processor to permit use of the new information, denying permission to use the new information while the OTP memory is in the first new state.

There is also provided, in accordance with an embodiment of the present invention, data security apparatus, including a data memory and a one-time programmable (OTP) memory, which includes multiple bits and has a current state defined by the bits of the OTP that have been programmed. A processor is configured, upon receiving new information to be written to the data memory, to select, based on the new information and the current state, at least one further bit of the OTP memory to be programmed, thereby defining a new state of the OTP memory, to compute a new digital signature over the new information and the new state, to save the new information and the new digital signature in the data memory, and after saving the new information and the new digital signature in the data memory, to program the at least one further bit of the OTP memory, whereby the new state becomes the current state.

The present invention will be more fully understood from the following detailed description of the embodiments thereof, taken together with the drawings in which:

DETAILED DESCRIPTION OF EMBODIMENTS

Overview

Figure 1:
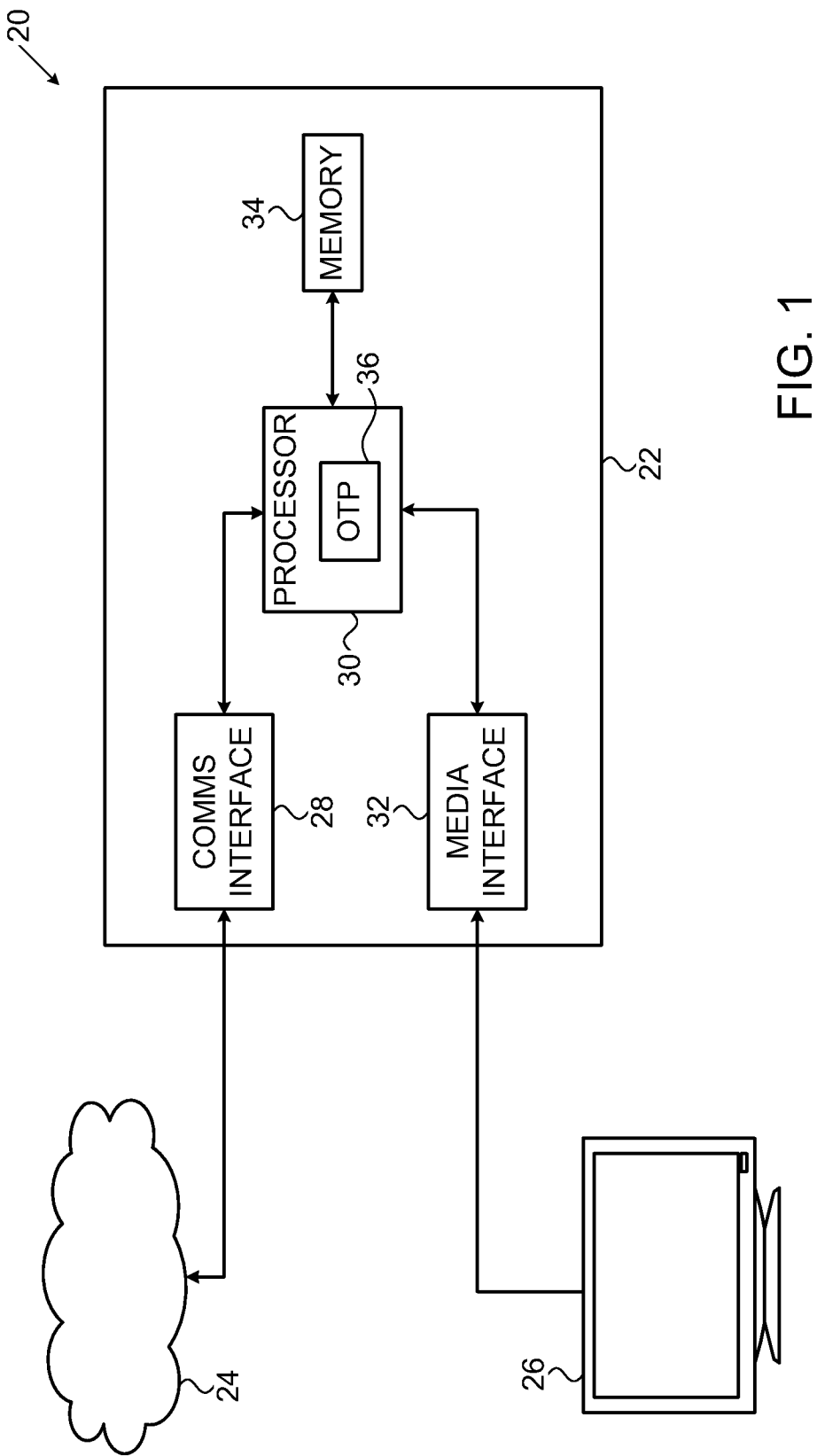
FIG. 1 is a block diagram that schematically illustrates a media delivery system, in accordance with an embodiment of the present invention.

One solution to the problem of playback attacks (as described above) is to provide the processor that is responsible for access control in a media device with a one-time programmable (OTP) memory array. One bit of the OTP memory is programmed (changed from 0 to 1, or alternatively changed from 1 to 0, depending on the applicable convention; also referred to as "burning" the bit) each time the NVM data is updated. A digital signature is computed over the information in the NVM together with the Hamming weight (number of "1" bits) of the OTP memory. Consequently, programming a bit in the OTP memory effectively revokes all previous signatures.

This approach, however, suffers from problems of reliability and security. If the OTP bit is programmed before the new signature is computed and stored in the NVM, and a reset occurs before the signature has been stored in the NVM, the device will be deadlocked after reset. On the other hand, if the new signature is computed and stored in the NVM before the OTP bit is programmed, the device is vulnerable to attack: An attacker may download an item of information (such as authorization information for accessing a certain content channel) but may then reset the processor before the OTP memory is programmed and the transaction is completed. This step may be repeated multiple times, to download multiple items. At each step, the processor computes a signature over the latest item, wherein all these signatures assume that one more OTP bit is to be programmed. Only after downloading the last item on the "shopping list" does the attacker allow the transaction to complete, whereupon one OTP bit is programmed. All the signatures then become valid—although the attacker's account will be charged only for the last item.

Embodiments of the present invention that are described hereinbelow provide methods and devices that can be used to address the reliability and data security problems described above. In these embodiments, a new digital signature is computed over an item of information and is saved in the NVM before the corresponding OTP bit (or bits) is programmed, thus mitigating the reliability problem. On the other hand, the digital signature covers not only the NVM state, but also the full state of the OTP memory, rather than just the Hamming weight as in methods that are known in the art. The "state" of the OTP memory is defined in this context by the actual distribution of the bits that are programmed, i.e., the actual binary word defined by the ones and zeros in the OTP (including the further bit or bits that are about to be programmed in conjunction with the new signature). Furthermore, the bit or bits that are to be programmed are not chosen arbitrarily, but rather are a function of the current state of the OTP memory and of the information item that is to be signed—so that a different OTP bit or bits will be designated for programming for each different information item that the device receives. (Typically, the parameters of this function are maintained as a secret by the processor.) Therefore, in the attack scenario described above, only the last digital signature will be valid, and all the earlier signatures will be useless.

Thus, in the disclosed embodiments, when the processor receives new information to be written to a data memory (which is typically, although not necessarily, implemented as NVM), it selects at least one further bit of the OTP memory to be programmed based on the new information and on the current state of the OTP memory (i.e., the state defined by the bits that have already been programmed). The bit or bits that are selected, taken together with the current state of the OTP memory, define a new state. The processor computes a new digital signature over the new information and the new state, and saves the new information and the new digital signature in the NVM. After saving the new information and the new digital signature in the NVM, the processor programs the selected bit or bits in the OTP memory, whereby the new state becomes the current state.

In typical use cases (such as controlling access to content), the new information received by the processor replaces old information that was stored previously in the data memory. After programming the OTP memory, the processor erases the old information, along with the digital signature of the old information, from the data memory. Upon receiving a request to permit use of the new information (to access a given content channel, for example), the processor checks the new digital signature that is saved in the data memory against the new information and the current state of the OTP memory, and permits access only when it confirms that the signature is valid.

In some embodiments, for greater reliability and/or security, multiple bits may be chosen for programming upon receipt of each new item of information, and in some cases, multiple signatures may be pre-computed. These embodiments are described in greater detail hereinbelow.

System Description

FIG. 1 is a block diagram that schematically illustrates a media delivery system 20, in accordance with an embodiment of the present invention. System 20 is built around a computerized media device 22, which may be implemented, for example, as a television set-top box (STB). Alternatively, some or all of the elements and functionality of device 22 may be incorporated in a smart card or in a portable media player, for example, or in any other applicable type computerized device. Device 22 controls the delivery of digital content from a network 24, such as a cable or satellite entertainment network or the Internet, to an output device 26, such as a television set or other video display.

Although the pictured embodiment and application examples that are described herein relate, for the sake of clarity and convenience, specifically to prevention of tampering with information associated with delivery of video content, the principles of the present invention may equally be applied to other sorts of content and to protection of sensitive information in other contexts. For example, these principles may be implemented in an e-cash card or a parking card. Thus, the context of system is shown and described here purely for the sake of illustration, and not limitation.

Device 22 is connected to receive information from network 24 via a communications interface 28 and to output content to output device 26 via a media interface 32. In the present example, the information received by device 22 includes authorization information, indicating that device 22 is allowed to download and deliver to output device 26 certain content. Upon receiving such authorization information, a processor 30 in device 22 stores the information securely in a data memory 34, which typically comprises non-volatile memory (NVM), such as flash memory. The stored information defines a state D of the data memory, and when new information is received (which may be used to replace old information), the state changes from D to D'.

Processor 30 typically comprises a microprocessor, which has suitable inputs and outputs and is programmed to carry out the functions described herein. The microprocessor may be programmed in software or firmware. Additionally or alternatively, at least some of the functions of processor 30 that are described herein may be carried out by hard-wired logic, which may be integrated into processor 30. Although processor 30, interfaces 28 and 32, and memory 34 are shown in FIG. 1 as separate functional components, some or all of these components may be integrated into a single integrated circuit chip or implemented using multiple chips. For example, although data memory 34 is shown as a single unit in FIG. 1, the data memory may alternatively comprise multiple segments in different chips, possibly including a segment that is embedded in processor 30, as well as memory of other types, such as a hard disk.

Device 22 comprises a one-time programmable (OTP) memory 36, which may be embedded, for enhanced security, in the same integrated circuit chip as processor 30, or together with the processor in a multi-chip module, as is shown in the figure. OTP memory 36 has a current state P, which is defined by the distribution of programmed bits in the OTP memory. In other words, state P can be regarded as an n-bit binary word comprising the sequence of ones (programmed bits) and zeros (bits not yet programmed) in the OTP memory.

For each data state D of data memory 34, processor stores a signature S in the data memory. The signature is computed over D and P, i.e., S=sig(D, P), wherein "sig" represents a signature function. P is updated before computing the signature, as described below. Typically, the signature is computed using a secret (private) key and a suitable cryptographic algorithm, which may be a symmetric or asymmetric algorithm. Processor 30 may compute the signature itself, or the signature may be computed by a separate signature unit (not shown).

When access to the secure information in memory 34, represented by state D, is requested, processor 30 verifies the stored signature S against the current states D and P of data memory 34 and OTP memory 36. When the signature function used a symmetric algorithm, processor 30 simply recomputes sig(D, P) using the same key as was used to generate the stored signature. Otherwise, if an asymmetric algorithm was used with a certain private key (which may be unknown to processor 30), the processor may apply the corresponding public key to verify S, as is known in the art. Once it has verified that signature S matches D and P, processor 30 typically permits access to the secure information in memory 34. Otherwise, tampering is suspected, and access is denied.

Figure 2:
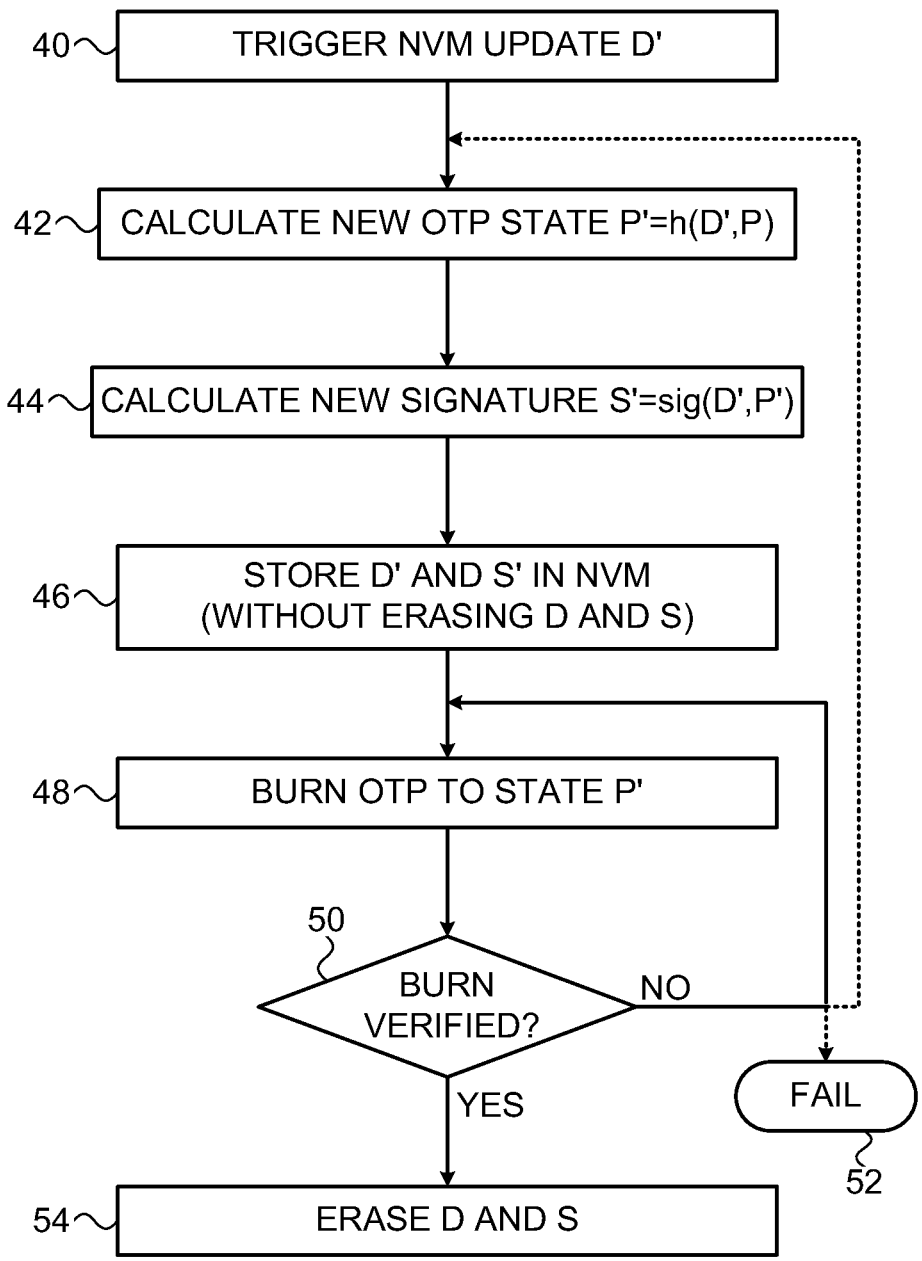
FIG. 2 is a flow chart that schematically illustrates a method for securely updating information stored in a memory, in accordance with an embodiment of the present invention.

FIG. 2 is a flow chart that schematically illustrates a method for securely updating information stored in data memory 34, in accordance with an embodiment of the present invention. For the sake of convenience and clarity, the method is described with reference to the elements of system 20 (FIG. 1), and it is assumed that processor 30 performs all computations itself. The method is in no way limited to this particular environment, however, and may alternatively be implemented using other sorts of devices that include data memory and OTP memory. Furthermore, as noted earlier, some of the computations involved in the method, such as signature computations, may be performed by a separate signature processor (not shown in the figures). The term "processor," as used in the context of the present patent application and in the claims, should therefore be understood as comprising both single-chip and multi-chip implementations of the processing functions described herein.

The method of FIG. 2 is triggered when device 22 receives new information, corresponding to a new state D' of data memory 34, at a triggering step 40. In response to this trigger, processor 30 computes a new state P' of OTP memory 36, in which one or more bits that are currently not yet programmed will be programmed, in an OTP state calculation step 42. P' is computed on the basis of the new data state D' and the current OTP state P, i.e., P'=h(D', P), wherein h is a function that designates one or more of the unprogrammed bits in state P that are now to be programmed. Typically, h is defined so that for all possible values of D', the resulting values of P' relative to P (i.e., the additional OTP bit or bits that are chosen for programming) will be roughly evenly distributed. The parameters of the function h are typically kept secret within processor 30, and may be hard-wired in the processor logic to make it difficult for an attacker to discover the parameters. Furthermore, processor 30 may contain an additional OTP memory (not shown), holding a unique secret value as one of the parameters of h. As a result, even if the attacker is successful in extracting the secret parameters from the processor in one device 22, these parameters will be of no use in attacking other devices.

After calculating the new OTP state P', but before actually programming OTP memory 36, processor 30 computes a new signature S'=sig(D', P'), at a signature calculation step 44. The processor then saves the new signature S', together with the new state D' (i.e., the new information received at step 40), in data memory 34, at a signature storage step 46. The processor does not yet erase the old state D and signature S, however.

Processor 30 programs the bit or bits necessary to bring OTP memory 36 from state P to state P', at an OTP burning step 48. In a basic embodiment, P' differs from P by a single bit, so that each transition of the state D of data memory 34 consumes a single bit of the OTP memory. Alternatively, multi-bit schemes may be used for enhanced reliability and/or security, as described below. Processor 30 tests the selected bit to verify that it has been properly programmed, at a burn verification step 50. If the selected bit is not properly programmed, step 48 may be repeated; and if multiple cycles through steps 48 and 50 do not result in successful programming of the OTP bit, processor 30 may go to a failure state 52.

In most cases, however, the OTP programming at step 48 will be successfully verified at step 50. Processor 30 concludes that the state transition to (D', P', S') has been completed successfully and therefore erases the old information (state D) and signature (D, S) from memory 34. D', P' and S' now become D, P and S for purposes of subsequent state verification and update.

The method described above is advantageous in that if the sequence of steps is interrupted at any point, processor 30 is still able to function, with a valid (D, S) pair. If the method is interrupted before step 48, or if step 48 fails, the old state (D, S) remains available in memory 34. If the method is interrupted after OTP memory 36 has been programmed to state P' (for example, after step 50), the new state (D', S') is operational, even though the old state (D, S) remains in memory 34, as well. In this latter case, however, the old memory state will fail signature verification, since it required the old OTP state P.

Furthermore, an attacker who attempts to collect multiple valid items of information (D) and corresponding signatures (S) by interrupting the above process after step 46 will be unsuccessful, since each successive new signature requires a different OTP state in order to be valid. At most, the attacker will be able to repeat the interrupted process enough times to find two data states $D_1$ and $D_2$ that share the same OTP state, i.e., the same $P'=h(D_1, P)=h(D_2, P)$. The number of data states that the attacker will need to traverse for this purpose is proportional to the number of the remaining unprogrammed bits in OTP memory 36. An enhancement of the above method that is aimed at reducing the probability that this sort of attack will succeed is described below.

Enhancing Reliability and Security

As noted above, when OTP memory 36 has a defective bit, which cannot be successfully programmed even in repeated iterations through step 48, the state update process may reach failure state 52. To avoid this sort of eventuality, a failure recovery routine may be added to the method of FIG. 2, as indicated by the dashed arrow leading from state 50 back to state 42. In place of the single state generation function h that is used in the basic scheme to compute P', k such functions are defined: (usually, k=2 will be sufficient), and the method iterates through steps 42-50 up to k times until step 50 is passed successfully. Only after k verification failures does the process actually go to failure step 52.

At each iteration in the operation of this method, a different $h_i$ is used at step 42, resulting in a different state $P_i'$, with a different bit in OTP memory 34 that is to be programmed (or possibly the same bit). Thus, in each iteration through step 44, a different digital signature $S_i'$ is computed, even though the new data state D' is the same. If step 50 is passed successfully for i=1, signature $S_1'$ is saved together with D'. On the other hand, if verification fails at step 50, processor 30 uses $h_2$ to compute $P_2'$ at step 42, and thus selects the bit to be programmed in OTP memory 36 on the basis of $P_2'$. A second signature $S_2'$ is computed at step 44. Assuming $P_2'$ is then properly programmed and verified at steps 48 and 50, processor 30 saves $S_2'$ with D' in memory 34, and discards the previous signature $S_1'$, along with S and D.

In another embodiment, the method of FIG. 2 may be modified for enhanced security by requiring that m OTP bits, m>1, be calculated and programmed in succession for each change in the operational state D of data memory 34. (Typically m=2 will be sufficient, but larger values of m may alternatively be used.) Only after all m bits have been programmed for a given new state D' does the corresponding information in memory 34 become usable. This feature will foil attackers who attempt to interrupt the signature process multiple times in order to find two data states $D_1$ and $D_2$ that share the same OTP state, since it is highly unlikely that the two data states will share the same sequence of m new bits that must be programmed in order to reach the new OTP state P'.

In other words, by comparison with the method of FIG. 2, this security-enhanced method repeats steps 42-50 m times. At the first iteration, processor 30 selects a first unprogrammed bit in OTP memory 36 at step 42 based on the new information D', thus defining a first new OTP state. At the next iteration through step 42, the processor will select a second unprogrammed bit in the OTP memory, based on D' and the first new OTP state, giving a second new OTP state. At each iteration, the new digital signature S' may be computed at step 44 and stored at step 46, and the selected bit is programmed at step 48. Only after the m-th iteration, however, after m new bits have been programmed, does the processor recognize the data state as being valid for access. The processor will deny permission to use the new information represented by D' in any prior state.

Figure 3:
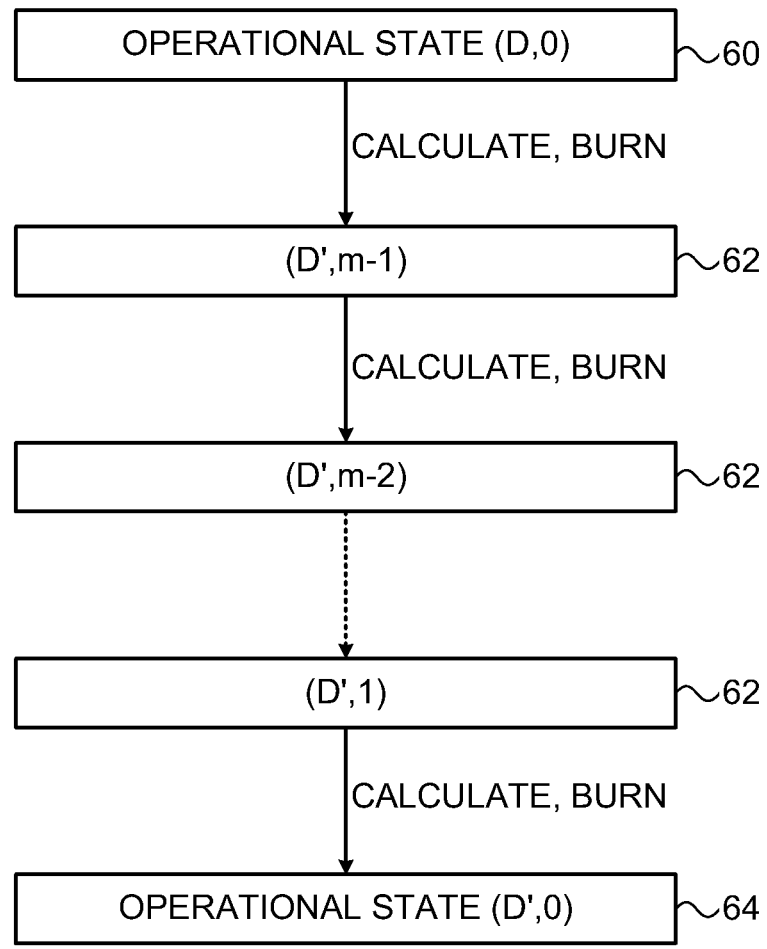
FIG. 3 is a state diagram that schematically illustrates a method for securely updating information stored in a memory, in accordance with another embodiment of the present invention.

FIG. 3 is a state diagram that schematically illustrates this method for updating information stored in memory 34 with enhanced security, in accordance with an embodiment of the present invention. The method illustrated in the figure defines extended states D*=(D, j), wherein j is an index indicating the current iteration. Only states with j=0 are operational states, in which processor 30 will grant access to the information in memory 34 corresponding to D. All other states are interim states in which access is forbidden.

The method of FIG. 3 begins in operational state 60, represented as (D, 0). At this stage, OTP memory 36 is in state P, and the old signature S is valid and stored in memory 34. When an update of the state of memory 34 to D' is triggered (step 40 in FIG. 2), processor 30 will make the transition to the first interim state 62 (D', m−1). For this purpose, the processor computes a new (interim) OTP state P' (step 42) and a new signature S' (step 44); saves the extended state (D', m−1) and signature S' in memory 34 (step 46); and programs the appropriate OTP bit to make the transition to OTP state P'. For greater reliability, processor 30 may repeat these steps multiple times, as described above, in case OTP programming fails at step 50.

Processor 30 repeats the above process to make the next state transition, from interim state (D', m−1) to interim state (D', m−2), and so on to interim state (D', 1), programming a new bit of OTP memory 36 at each iteration. Finally, in the last iteration, after computing and programming the m-th OTP bit and the corresponding signature S', processor 30 makes the transition to the next operational state 64 (D', 0), and the information corresponding to D' becomes available.

The parameters k (the number of "reliability iterations") and m (the number of "security iterations") may be adjusted depending on application requirements. For example, as the number of remaining unprogrammed OTP bits decreases during the life of device 22, m may increase so as to reduce the probability that an attacker will find two items of information with the same OTP state.

Furthermore, the above reliability and security enhancement approaches may be combined in an alternative embodiment in which for each update of the memory state D, s out of m OTP bits are arbitrarily selected to be programmed. Signatures corresponding to all possible sets of s out of m bits are computed beforehand. This scheme is useful when high security is desired, while OTP reliability may be inadequate.

In this embodiment, unlike the high-reliability scheme described above, there is only one OTP update function h, but P'=h(D', P) differs from P by m bits, rather than by a single bit. In the transition from memory state D to D', s OTP bits are programmed. For any OTP state P, let |P| be the number of "1" bits in P, and let the notation $P_1 \subseteq P_2$ mean that every bit with the value "1" in $P_1$ is also "1" in $P_2$. For states P, P' with |P'|−|P|=m, let L(P, P') denote the set of all OTP states Q such that $P \subseteq Q \subseteq P'$ and |Q|−|P|=s. It can be seen that there are exactly $\binom{m}{s}$ OTP states in L(P, P').

In this last embodiment, the sequence of steps in the transition from D to D' is as follows:
1. Calculate P'=h(D', P).
2. Store D' in memory 34.
3. For every Q∈L(P, P') calculate $S_Q$=sig(D', Q) (without actual changing the OTP state from P to Q), and store $S_Q$ in memory 34.

4. Set Count=0.
5. Perform steps a-c below for every OTP bit $b_i \in P' \backslash P$ (i.e., for the m bits that are "1" in P' and "0" in P):
   a. Program $b_i$.
   b. If $b_i$ has been programmed successfully, set Count=Count+1.
   c. If Count=s, go to step 7.
6. Fail (if less than s bits have been successfully programmed).
7. Exactly s bits have been burned, and the present OTP state $Q \in L(P,P')$. Leave only $(D', S_Q)$ in memory 34, and erase the other signatures.

The high-reliability scheme described at the beginning of this section can be seen as a special case of this latter method with m=1.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for data security, comprising:
   in a processor having a one-time programmable (OTP) memory, which includes multiple bits and has a current state P defined by the bits of the OTP that have been programmed, receiving new information to be written to a data memory, the new information corresponding to a new state D' of the data memory;
   computing a new state P' of the OTP memory based on the new state D' of the data memory and the current state of the OTP such that P'=h(D',P), wherein h is a function that designates one or more un-programmed bits in the state P that are to be programmed based on said computing;
   selecting which at least one further bit of the bits of the OTP memory is to be programmed;
   computing a new digital signature over the new information and the new state, wherein the new digital signature depends on a distribution of the programmed bits of the OTP memory and not only on a number of the bits that have been programmed;
   saving the new information and the new digital signature in the data memory; and
   after saving the new information and the new digital signature in the data memory, programming the at least one further bit of the OTP memory, the new state of the OTP memory becoming the current state.

2. The method according to claim 1, wherein receiving the new information comprises replacing old information that is stored in the data memory with the new information, wherein the old information is signed with an old digital signature in the data memory, and wherein the method comprises erasing the old information and the old digital signature from the data memory after programming the at least one bit of the OTP memory.

3. The method according to claim 1, and comprising, upon receiving a request to the processor to permit use of the new information, verifying the new digital signature that is saved in the data memory against the new information and the current state of the OTP memory.

4. The method according to claim 1, wherein selecting the at least one further bit comprises applying a function over the new information and the current state, the function having parameters maintained as a secret by the processor.

5. The method according to claim 1 wherein selecting the at least one further bit comprises selecting at least first and second bits, thereby defining at least first and second, respective new states, and
   wherein computing the new digital signature comprises computing at least first and second, respective digital signatures for the at least first and second new states, and
   wherein programming the at least one further bit comprises attempting to program the first bit, testing the OTP memory to verify the programming of the first bit, and if the first bit has not been properly programmed, programming the second bit and saving the second digital signature while discarding the first digital signature.

6. The method according to claim 1, wherein selecting the at least one further bit comprises selecting at least first and second bits based on the new information and the current state, wherein the new state of the OTP memory is defined such that in the new state, at least both the first and second bits are programmed, and
   wherein programming the at least one further bit comprises programming at least both the first and second bits.

7. The method according to claim 6, wherein selecting at least the first and second bits comprises:
   selecting the first bit based on the new information and the current state, thereby defining a first new state of the OTP memory; and
   selecting the second bit based on the new information and the first new state, thereby defining a second new state of the OTP memory, over which the new digital signature is computed, and
   wherein the method comprises, upon receiving a request to the processor to permit use of the new information, denying permission to use the new information while the OTP memory is in the first new state.

8. Data security apparatus, comprising:
   a data memory;
   a one-time programmable (OTP) memory, which includes multiple bits and has a current state P defined by the bits of the OTP that have been programmed; and
   a processor, which is configured, upon receiving new information to be written to the data memory, the new information corresponding to a new state D' of the data memory, to: compute a new state P' of the OTP memory, based on the new state D' of the data memory and the current state of the OTP such that P'=h(D',P), where h is a function that designates one or more un-programmed bits in the state P that are to be programmed based on computing the new state P'; select which at least one further bit of the bits of the OTP memory is to be programmed; compute a new digital signature over the new information and the new state, wherein the new digital signature depends on a distribution of the programmed bits of the OTP memory and not only on a number of the bits that have been programmed, and
   wherein the processor is configured to save the new information and the new digital signature in the data memory, and after saving the new information and the new digital signature in the data memory, to program the at least one further bit of the OTP memory, the new state of the OTP memory becoming the current state.

9. The apparatus according to claim 8, wherein the processor is configured to replace old information that is stored in the data memory with the new information, wherein the old information is signed with an old digital signature in the data memory, and wherein the processor is configured to erase the old information and the old digital signature from the data memory after programming the at least one bit of the OTP memory.

10. The apparatus according to claim 8, wherein the processor is configured, upon receiving a request to permit use of the new information, to verify the new digital signature that is saved in the data memory against the new information and the current state of the OTP memory.

11. The apparatus according to claim 8, wherein the processor is configured to select the at least one further bit by applying a function over the new information and the current state, the function having parameters maintained as a secret by the processor.

12. The apparatus according to claim 8, wherein the at least one further bit comprises at least first and second bits, which define at least first and second, respective new states, and wherein the processor is configured to compute at least first and second, respective digital signatures for the at least first and second new states, to attempt to program the first bit, to test the OTP memory to verify the programming of the first bit, and if the first bit has not been properly programmed, to program the second bit and save the second digital signature while discarding the first digital signature.

13. The apparatus according to claim 8, wherein the at least one further bit comprises at least first and second bits, which are selected by the processor based on the new information and the current state, wherein the new state of the OTP memory is defined such that in the new state, at least both the first and second bits are programmed, and wherein the processor is configured to program at least both the first and second bits after saving the new information and the new digital signature in the data memory.

14. The apparatus according to claim 13, wherein the processor is configured to select the first bit based on the new information and the current state, thereby defining a first new state of the OTP memory, and to select the second bit based on the new information and the first new state, thereby defining a second new state of the OTP memory, over which the new digital signature is computed, and wherein the processor is configured, upon receiving a request to the processor to permit use of the new information, to deny permission to use the new information while the OTP memory is in the first new state.

* * * * *

UNITED STATES PATENT AND TRADEMARK OFFICE
CERTIFICATE OF CORRECTION

PATENT NO. : 9,009,492 B2
APPLICATION NO. : 14/111670
DATED : April 14, 2015
INVENTOR(S) : Yaacov Belenky et al.

It is certified that error appears in the above-identified patent and that said Letters Patent is hereby corrected as shown below:

In the Specification

In column 4, line 66, delete "system is" and substitute therefor --system 20 is--;

In column 5, line 39, delete "processor stores" and substitute therefor --processor 30 stores--;

In column 7, line 28, delete "defined: (usually," and substitute therefor --defined: h1, ..., hk (usually,--.

Signed and Sealed this
Second Day of June, 2015

Michelle K. Lee
*Director of the United States Patent and Trademark Office*